United States Patent
Ortiz et al.

(10) Patent No.: US 10,583,776 B1
(45) Date of Patent: Mar. 10, 2020

(54) DEVICE AND METHOD FOR PROVIDING INDICATION TO REAR VEHICLE DEPENDING ON BRAKE FORCE APPLIED BY VEHICLE

(71) Applicants: Luis R. Ortiz, Weston, FL (US); Pedro J. Lopez, Miramar, FL (US)

(72) Inventors: Luis R. Ortiz, Weston, FL (US); Pedro J. Lopez, Miramar, FL (US)

( * ) Notice: Subject to any disclaimer, the term of this patent is extended or adjusted under 35 U.S.C. 154(b) by 0 days.

(21) Appl. No.: 16/135,165

(22) Filed: Sep. 19, 2018

(51) Int. Cl.
*B60Q 1/44* (2006.01)
*B60Q 1/26* (2006.01)

(52) U.S. Cl.
CPC ............ *B60Q 1/444* (2013.01); *B60Q 1/2696* (2013.01)

(58) Field of Classification Search
CPC ........ B60Q 1/444; B60Q 1/2696; B60Q 1/44; B60Q 1/0076; B60T 7/042; H05B 33/0854; H05B 33/0872
See application file for complete search history.

(56) References Cited

U.S. PATENT DOCUMENTS

| | | | | |
|---|---|---|---|---|
| 3,914,739 | A | 10/1975 | Caughlin | |
| 5,988,839 | A * | 11/1999 | Pokorney | B60Q 1/30 362/493 |
| 7,352,278 | B2 * | 4/2008 | Terzian | B60Q 1/302 340/463 |
| 9,333,903 | B2 * | 5/2016 | Kim | B60Q 1/143 |
| 10,081,297 | B1 * | 9/2018 | Yelda | H05B 33/0854 |
| 2006/0262553 | A1 * | 11/2006 | Bogos | B60Q 1/302 362/541 |
| 2008/0164993 | A1 * | 7/2008 | Douglas | B60Q 1/444 340/479 |
| 2008/0309478 | A1 * | 12/2008 | Morales | B60Q 1/444 340/467 |
| 2014/0253315 | A1 * | 9/2014 | Bement | B60Q 1/447 340/479 |
| 2014/0309856 | A1 * | 10/2014 | Willson-Quayle | B60Q 1/444 701/36 |
| 2015/0137965 | A1 * | 5/2015 | Lanham | B60Q 1/2607 340/479 |
| 2016/0185283 | A1 * | 6/2016 | Weiner | B60Q 1/441 340/469 |
| 2016/0214528 | A1 * | 7/2016 | Eastman | B60Q 1/444 |
| 2016/0250966 | A1 * | 9/2016 | Giguere | B60Q 1/444 340/479 |

(Continued)

FOREIGN PATENT DOCUMENTS

DE        3319731      12/1984

*Primary Examiner* — An T Nguyen
(74) *Attorney, Agent, or Firm* — Sanchelima & Associates, P.A.; Christian Sanchelima; Jesus Sanchelima

(57) ABSTRACT

The present invention is a brake level indication device that indicates brake force applied by front vehicle driver to rear vehicle driver by switching ON and OFF series of LEDs or bulbs. It includes sensor which converts force applied to the brake in the form of variable electrical signal. The variable electrical signal is digitized into different levels by peripheral interface of microcontroller. The microprocessor processes the digitized data, depending on the level of output signal, turns ON the series of LEDs or bulbs. If full brake is applied, then all the bulbs or LEDs will be turned ON and also emergency flash light is turned ON. Providing braking information of front vehicle and indicating it to rear vehicle will reduce death rate due to vehicle collision.

1 Claim, 3 Drawing Sheets

(56) References Cited

U.S. PATENT DOCUMENTS

| | | | |
|---|---|---|---|
| 2017/0028906 A1* | 2/2017 | Beach | B60Q 1/441 |
| 2017/0162046 A1* | 6/2017 | Alanazi | B60Q 5/005 |
| 2018/0056856 A1* | 3/2018 | Shupe | B60Q 1/444 |
| 2018/0236933 A1* | 8/2018 | Pontsler | B60Q 1/444 |

\* cited by examiner

DEVICE AND METHOD FOR PROVIDING INDICATION TO REAR VEHICLE DEPENDING ON BRAKE FORCE APPLIED BY VEHICLE

BACKGROUND OF THE INVENTION

1. Field of the Invention

The present disclosure relates to a vehicle safety device. More particularly, the present disclosure relates to a device and method for providing indication to rear vehicle depending on brake force applied by front vehicle.

2. Description of the Related Art

While riding vehicle, it necessary to know how front vehicle brakes to rear vehicle, to avoid collision of two vehicles. Knowing braking information of front vehicle and indicating it to rear vehicle is important to reduce death rate due to collision, as this braking information will provide better idea to driver how front vehicle is braking to rear vehicle and accordingly the rear vehicle driver can drive the vehicle.

Applicant believes that a related reference corresponds to German patent application DE3319731A1 filed by Rodriguez Holger for a dynamic brake lights for vehicles. The Rodriguez Holger reference relates to the dynamic representation of the braking process in vehicles. The intensity and duration of the braking process is made visually and/or audibly perceptible. Depending on the intensity of the braking process, one or more lighting surfaces migrate according to a determined sequence and structure so that the precise perception of the dynamic braking process is conveyed to the traffic behind. The signal required for this is acquired from a generally known acceleration sensor. An electronic evaluation circuit produces a series of pulses for actuating the different light elements. Since the eye responds best to intermittent or migrating light surfaces, in this case the driver of the vehicle behind can react more quickly and with adapted braking force.

Another related application is US patent application number US20170028906A1 filed by Patrick Beach for a braking system with variable brake lights. The Patrick Beach reference discloses a braking system for indicating brake pad application that includes: a brake lever; a brake pad at the distal end of the brake lever; and a pressure detector connected to the brake lever, where the pressure detector detects pressure applied to the brake pad. A plurality of wire leads extends from the pressure detector and connected to the brake lever. The braking system includes a means to vary brake light illumination based upon pressure detected by the pressure detector providing three levels of illumination. A first brake illumination indicates a normal brake pressure application; a second brake illumination indicates a second level of brake pressure at a higher intensity than the normal brake pressure; and a third brake illumination indicates a third level of brake pressure at a highest intensity of brake pressure.

Another related application is U.S. Pat. No. 3,914,739A filed by CAUGHLIN JAMES DANIEL for a vehicle brake and indicator light control system. The CAUGHLIN JAMES DANIEL reference discloses a light control system for vehicle brake lights that functions to blink the brake lights a number of times, such as three, upon applying the brakes and then holds the brake lights in the on condition as long as the brakes are held on. The control system uses a pulse counting arrangement, in which the light system is normally on, but is turned off successively with the count and then is held in the on condition. The control system is used with existing cars with existing turn indicator switch arrangements or can be used as original equipment on vehicles where the pulsing mechanism functions as the turn indicator flasher circuit.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a device which gives indication to rear vehicle depending on brake force applied to vehicle.

It is yet another object of the present invention to provide a device which gives variable output indication to rear vehicle depending on the actual level of brake pressed by front vehicle driver.

It is still another object of the present invention to provide a device which converts the force applied to brake of front vehicle into variable electrical signal. The variable electrical signal is used to turn ON number of bulbs or LEDs positioned on rear side of the front vehicle, depending on the level of electrical signal.

It is another object of the present invention to provide a device which turns ON emergency flash lights when full brake is pressed by front vehicle driver.

It is another object of the present invention to provide a brake level indication device installed in rear side of a vehicle to indicate braking of vehicle to rear vehicle. The device comprises at least one sensor used to detect press force applied to brake pedal and convert press force to variable electrical signal; at least one input peripheral interface used to convert variable electrical signal from sensor to variable digital signal; at least one microcontroller to process digital signal and generate variable digital control signal; at least one output peripheral interface used to convert variable digital control signal suitable for control operation; at least one lighting unit comprising a series of lights, wherein series of lights are turn ON or OFF based on variable control signal from output peripheral interface; and at least one flash light turned ON when full brake is applied. The series of lights are turned ON or OFF based on the press force applied to brake pedal. Turn ON or OFF of series of lights and/or flash light indicates braking of front vehicle to rear vehicle.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
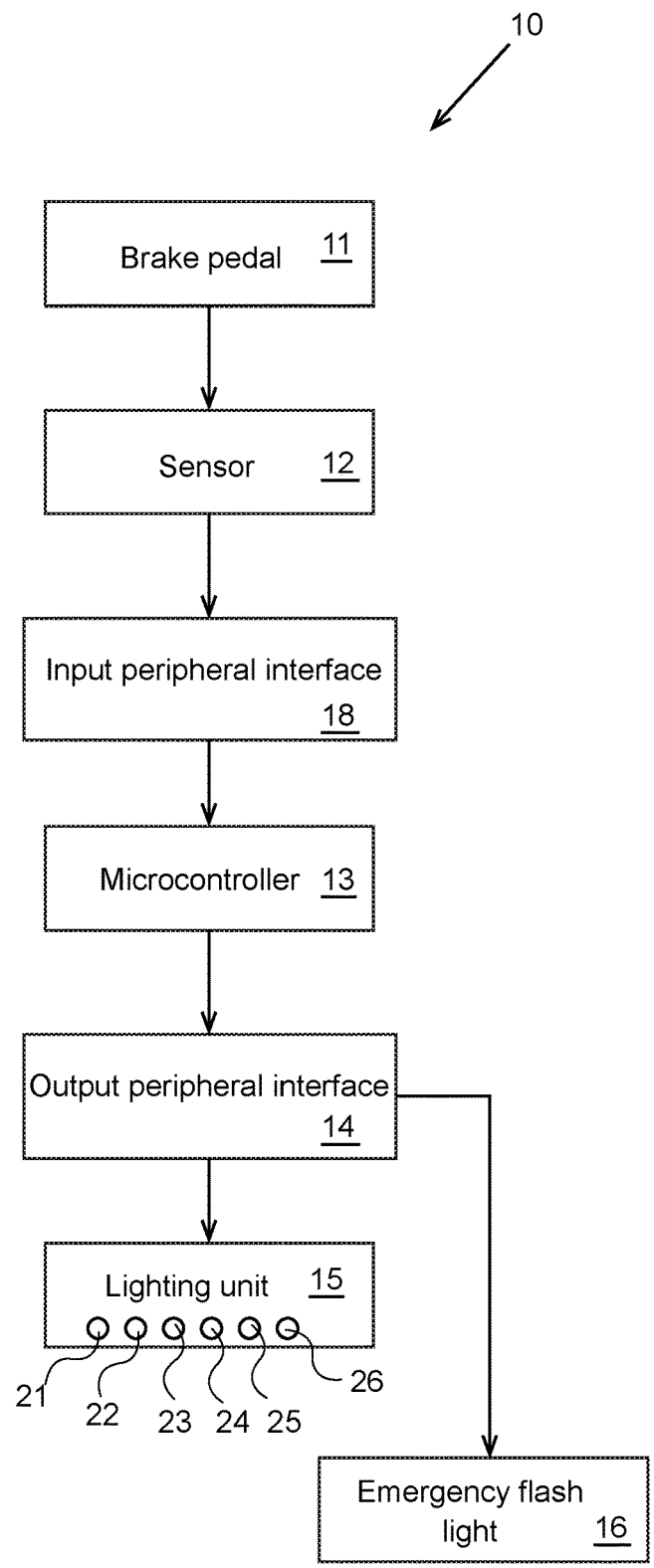
FIG. 1 represents a block diagram of brake level indication device 10 of present invention comprising of sensor or transducer 12 connected to microcontroller 13 having output peripheral interface 14 to turn ON series of bulbs or Light Emitting Devises (LEDs) in lighting unit 15.

Referring now to the FIG. 1, where the present invention is generally referred to brake level indication device 10, in accordance with one embodiment of the invention. Normally, the brake level indication device 10 can be installed in all vehicle, but in order to explain the invention in a better way, the device 10 installed vehicle is referred as front vehicle and the vehicle at rear side of front vehicle is referred as rear vehicle. The brake level indication device 10 installed in rear side of front vehicle to provide indication to rear vehicle that how hard front vehicle brake is pressed/depressed.

Brake level indication device 10 comprises sensor or transducer 12 which converts linear force applied to brake pedal 11 into variable electrical signal. Sensor or transducer 12 output is connected to microcontroller 13 through input peripheral interface 18. The microcontroller 13 processes the output electrical signal and generates variable control signal to appropriately turns ON series of bulbs/LEDs 21 to 26 in lighting unit 15, through output peripheral interface 14. Microcontroller 13 is also interfaced to emergency flash light 16 which will be turn ON in case when full brake is press. By installing the bulbs/LEDs 21 to 26 in rear side of front vehicle, depending on brake force applied in front vehicle, number of bulbs/LEDs 21 to 26 will turn ON and thus indicate to rear vehicle that how hard is front vehicle brake pedal 11 presses/depresses, therefore how sudden is front vehicle is going to decelerate or stop.

The input peripheral interface 18 can be used to convert the variable electrical signal from sensor to variable digital signal. The output peripheral interface 14 is used to convert variable digital signal from microcontroller 13 to suitable control signal which is used to control bulbs/LEDs 21 to 26 and emergency flash light 16. The output peripheral interface 14 can be not limited to for example, Random Access Memory (RAM), Analog to Digital (A-D) converter, serial to parallel converter and so on. The output peripheral interface 14 can be not limited to for example, buffer or memory, multiple output LED driver and so on.

Figure 2:
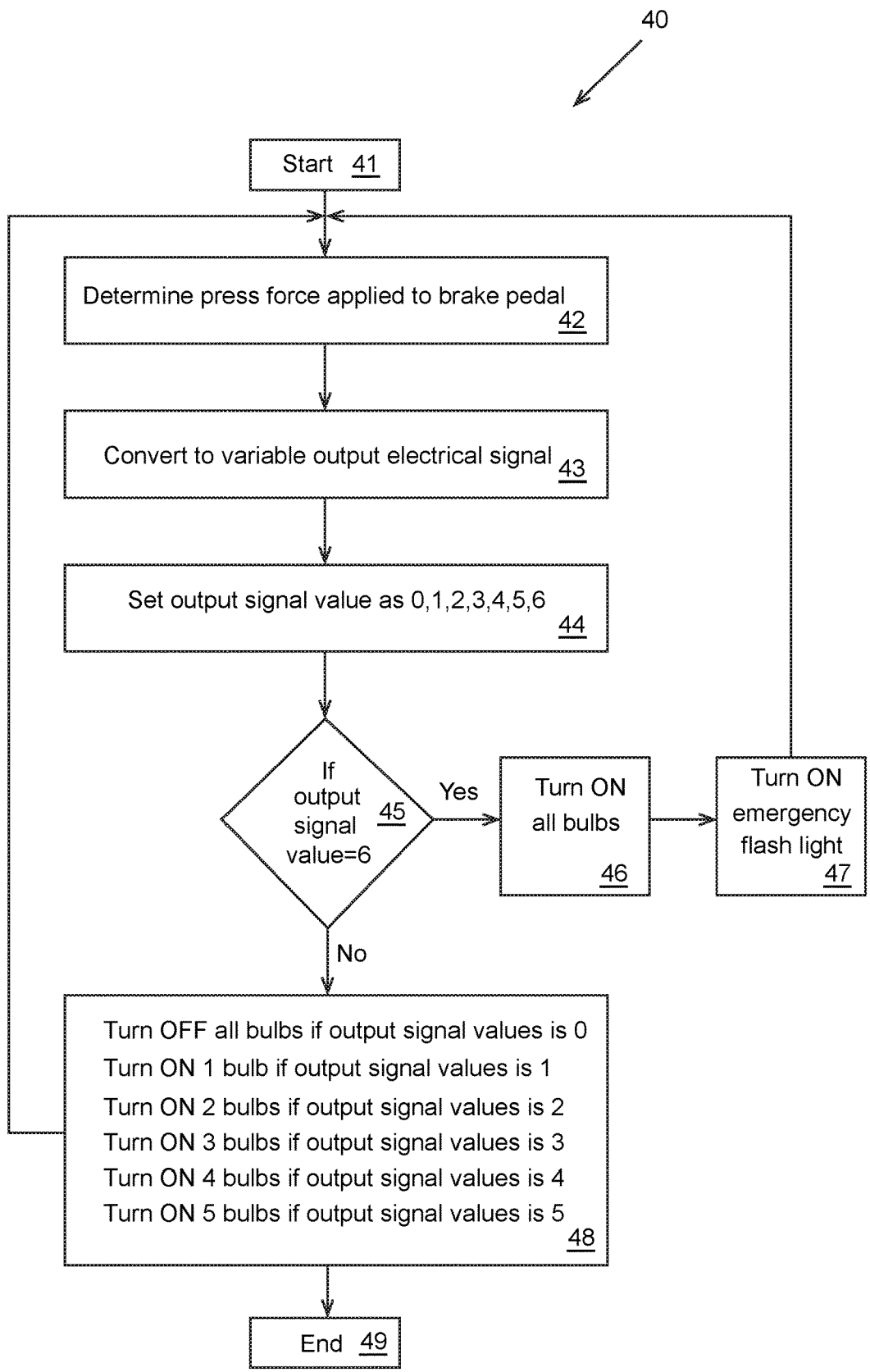
FIG. 2 shows a flow of operations carried out by brake level indication device 10 upon pressing of brake pedal by vehicle driver.

Referring to FIG. 2 the flow chart 40 explains the operation of brake level indication device 10. The process starts as at step 41. The sensor or transducer 12 determines the press force applied to brake pedal 11 by driver of vehicle, as at step 42. Sensor or transducer 12 converts press force in to variable output electrical signal, as depicted in step 43. Variable output electrical signal can be Alternating Current (AC) or Direct Current (DC), without any limitations. The variable output signal depends on the press force applied to brake pedal 11 by driver of vehicle. Output electrical signal is digitized in to different levels not limited to levels/value, say 0, 1, 2, 3, 4, 5 and 6, as shown in step 44. The level/values can be set, based on the number of bulbs/lights that user prefer to have in rear side of vehicle to indicate braking strategy to rear vehicle. Microcontroller 13 turns ON all the bulbs or LEDs and also emergency flash light when full level brake force is applied, as depicted in the steps 45, 46, and 47. Microcontroller 13 switches ON and OFF one or more bulbs/LEDs depending on the output signal levels as depicted in the step 48. The one or more bulbs/LEDs are indicated depending on press force applied by vehicle to the brake pedal of the device 40. The process continues until the vehicle is turned off. When the vehicle is turned off, the process ends, as at step 49.

Examples of microcontroller can be without limitation, microcontroller 8031 and 8051 and examples of microprocessor can be without limitation, microprocessor 8085 and 8088. The sensor can be a transducer. The sensor can be without limitation, which can convert press force of brake pedal to variable electrical signal.

Figure 3:
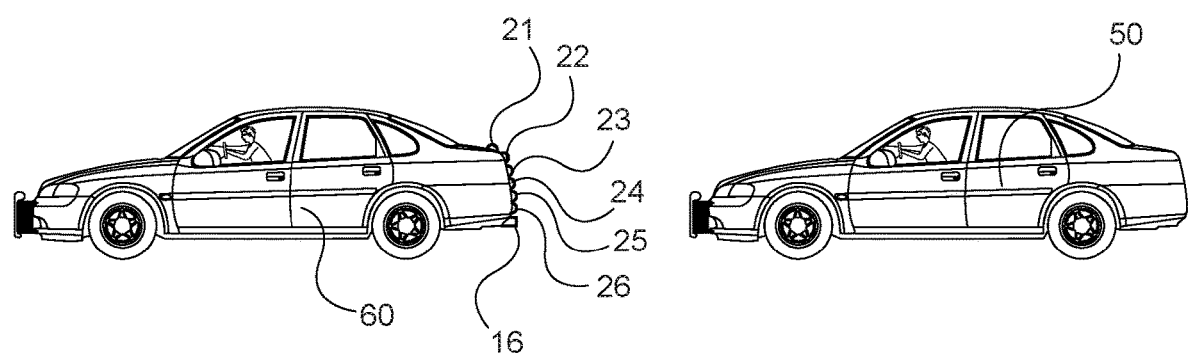
FIG. 3 shows side view of brake level indication device 10 of FIG. 1 installed in front vehicle 60 to provide braking information of front vehicle 60 to rear vehicle 50.

FIG. 3 shows front view of brake level indication device comprising series of LEDs/bulbs 21, 22, 23, 24, 25 and 26. It is also showed emergency flash light 16. As depicted in the FIG. 3 depending on the brake force, the number of bulbs or LEDs will be switched ON. Emergency flash light 16 is turned ON along with all bulbs/LEDs, when full brake is applied. Depending on the brake force, number of LEDs or bulbs will be turned ON indicating the braking of front vehicle 60 to driver of rear vehicle 50, so that rear vehicle 50 can be accelerated or de-accelerated accordingly to avoid collision. For example, no bulb or LED is turned ON, when driver of front vehicle 60 applies no force to brake pedal (means vehicle is accelerated); one or more bulbs/LEDs can be turned ON, when force applied is of the range less to just near maximum force that can be applied to the brake pedal. When the brake is applied fully, all the bulb/LEDs and/or emergency flash light can be turned ON. Rear vehicle 50 and front vehicle 60 as shown in FIG. 3 are cars, but the present invention can be used in any vehicle that uses braking pedals to brake or stop vehicle. The lighting unit 15 is not limited to bulbs or LEDs, other lighting devices suitable for indication and fixable on vehicle can also be used. The lighting unit 15 can also include emergency flash light 16. Further, lighting unit 15 can be placed a location on rear side of front vehicle 60, such that driver of rear vehicle 50 can easily view/see the indications from driver seat.

Present invention provides braking information in the form of indications in series of bulb/LEDs. Knowing braking information of front vehicle and indicating it to rear vehicle will reduce death rate due to vehicle collision, as this braking information will provide better idea to rear driver how front vehicle is braking to rear vehicle and accordingly the rear vehicle driver can drive the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A brake level indication device installed on the rear side of a vehicle to indicate braking of said vehicle to a rear vehicle, comprising:
   a. at least one sensor used to detect a press force applied to a brake pedal and said at least one sensor converts said press force into a variable electrical signal;
   b. at least one input peripheral interface adapted to convert said variable electrical signal from said at least one sensor to a variable digital signal from one of 0, 1, 2, 3, 4, 5, 6 to indicate various levels corresponding to the number of lights mounted thereon;
   c. at least one microcontroller to process said variable digital signal and generate a variable digital control signal;
   d. at least one output peripheral interface used to interpret said variable digital control signal; and e. a series of lights located on said at least one lighting unit, said series of lights are mounted vertically on said rear side of a vehicle and further include an emergency flash light mounted underneath the bottommost light of said series of lights, wherein said series of lights include a semi-circular outer edge, wherein said emergency flash light has a different shape from said series of lights, wherein said emergency flash light has a rectangular outer edge, wherein said emergency flash light is mounted on a bottom most end of a rear bumper of said vehicle, wherein a top most light of said series of lights is mounted on top a trunk of a rear end of said vehicle, wherein said top most light is pointing in an upward direction, wherein said series of lights are each spaced apart a predetermined amount, wherein the location of said series of lights and said emergency lights is configured to provide a driver driving behind said vehicle an optimal view to determine the braking status of a user driving said vehicle, wherein said series of lights are sequentially turned ON or OFF based on said variable digital signal determined from said press force, the greater the press force the more of said lights are sequentially turned on, wherein as the press force increases the previously lit said lights sequentially turned on remain lit, wherein if said variable digital signal is a 0 value then all lights are turned OFF, wherein if said variable digital signal is a 1 value then said top most light of said series of lights is then turned ON, wherein if said variable digital signal is a 2 value then two sequenced lights are then turned ON, wherein if said variable digital signal is a 3 value then three sequenced lights are then turned ON, wherein if said variable digital signal is a 4 value then four sequenced lights are then turned ON, wherein if said variable digital signal is a 5 value then five sequenced lights are then turned on, wherein upon a predetermined threshold being reached all of said lights will turn on, said emergency flash light only being turned on upon said predetermined threshold being exceed and said emergency flash light only turning on upon all of said lights being on, wherein said predetermined threshold is a 5 value from said variable digital signal, wherein said predetermined threshold is exceeded when said variable digital signal is a 6 value.

* * * * *